United States Patent Office 3,391,996
Patented July 9, 1968

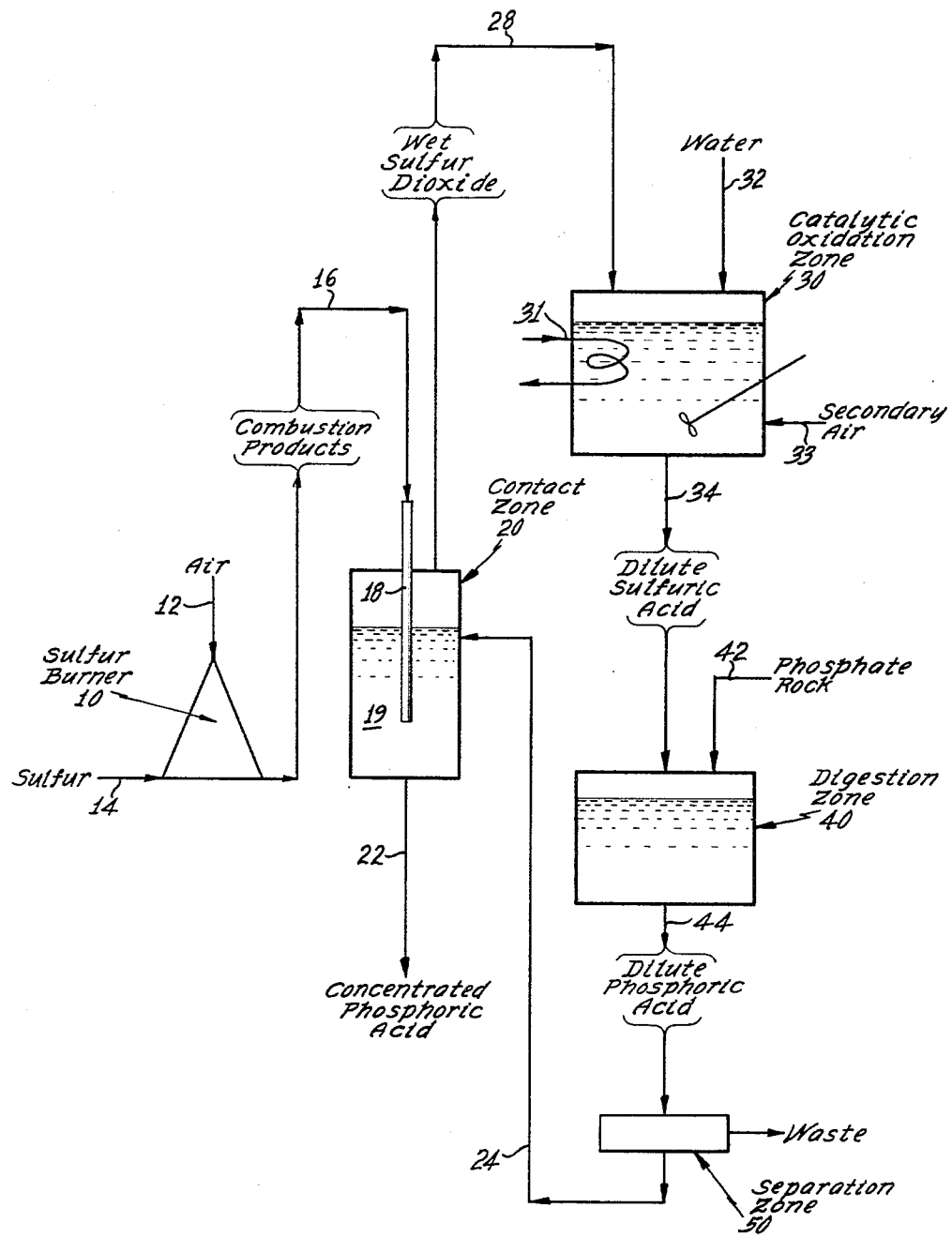

3,391,996
PHOSPHORIC ACID PROCESS
Christiaan P. van Dijk, Westfield, James P. Van Hook, Basking Ridge, and Kenneth M. Barclay, Stockton, N.J., assignors to Pullman Incorporated, Chicago, Ill., a corporation of Delaware
Filed May 7, 1965, Ser. No. 453,949
11 Claims. (Cl. 23—165)

The present invention relates to the production of phosphoric acid, and more particularly, it relates to a novel process for making and recovering phosphoric acid in an efficient manner. Still more particularly, this invention relates to a unique combination of known chemical reactions and unit operations to constitute a novel process for manufacturing concentrated phosphoric acid employing sulfur or sulfur-containing material, oxygen-containing gas, and phosphate rock ore as starting materials.

In th past, phosphoric acid has been produced in accordance with several well-known methods including the electric furnace process, the blast furnace process, and wet processes, such as the Dorr strong-acid and the Prayon processes. In the Prayon modification, phosphate rock is treated with sulfuric acid under temperature and concentration conditions that yield calcium sulfate crystals of predetermined size to facilitate continuous filtration. While the electric furnace process is capable of producing a relatively pure product, the use of this process is not entirely satisfactory by reason of the relatively large initial investment required as compared with the wet process investment and also because the slag, carbon dioxide, and ferrosilicon by-products are not readily and completely utilized. Electric furnace acid is, however, preferred over wet process acid, in many cases, by reason of favorable product purity and expense. Unfortunately, the cost of production, purification, and concentration in accordance with wet process methods of the past has made the wet process commercially unattractive, notwithstanding the relatively low installation cost as compared to electric furnace costs.

It is, therefore, an object of the present invention to overcome and eliminate the inherent disadvantages of wet phosphoric acid processes of the past and to make available a commercially attractive and efficient process for producing concentrated phosphoric acid starting with sulfur or a sulfur-bearing material, an oxygen-containing gas, and phosphate rock ore as raw materials for the process.

Another object of the invention is to manufacture concentrated phosphoric acid.

Another object of the invention is to present a novel method for producing dilute phosphoric acid and for concentrating the dilute acid in an efficient manner.

Other objects and advantages inherent in the invention will become apparent to those skilled in the art from the following description and drawing.

The objects are generally accomplished in accordance with the present invention by combusting a sulfur-containing material, e.g., hydrogen sulfide or sulfur, in an oxygen-containing gas such as, e.g., air with or without oxygen enrichment, thereby producing sulfur dioxide at an elevated temperature, and contacting an aqueous solution containing phosphoric acid with the gaseous material at an elevated temperature in a suitable contact zone under conditions to strip and evaporate water from the solution into the vapor phase maintained over the solution which contains wet sulfur dioxide. Vaporous material containing wet sulfur dioxide is passed into an oxidation zone containing an aqueous solution of catalyst suitable for converting the sulfur dioxide into a relatively dilute aqueous solution of sulfuric acid. The dilute sulfuric acid is reacted with phosphatic material, e.g., such as tricalcium phosphate, monobasic calcium phosphate, and dibasic calcium phosphate in the digestion of phosphate rock ore under conditions to produce a dilute aqueous solution containing phosphoric acid and hydrated crystals of calcium sulfate which are readily separated from the solution. The hydrated calcium sulfate, siliceous and other insoluble material are separated from the relatively dilute acid which is then concentrated by contact with the gaseous products of the sulfur combustion at an elevated temperature as set forth above. In accordance with the process of the present invention, phosphoric acid concentration between 40–90 percent can be achieved without employing additional sources of energy for the concentration.

The advantages which are apparent from this process include the utilization of the exothermic heat of reaction of the sulfur oxidation step, and the elimination of the sulfur trioxide and concentrated sulfuric acid production equipment such as is needed in wet processes of the past. Advantages include the production of highly concentrated phosphoric acid in an efficient and economical manner which does not require additional heat exchange equipment or energy input, recovery of up to 100 percent of the $P_2O_5$ value of the rock made possible by utilization of dilute sulfuric acid rather than concentrated acid, and the facility of separation of calcium sulfate crystals which are produced in the hydrated form by reason of the use of dilute acid in the digestion step.

The sulfur oxidation step proceeds in accordance with the following highly exothermic reactions which are set out by way of example:

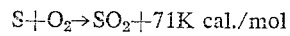
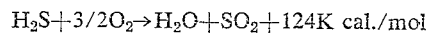

$$S+O_2 \rightarrow SO_2+71K \text{ cal./mol}$$
$$H_2S+3/2O_2 \rightarrow H_2O+SO_2+124K \text{ cal./mol}$$

These reactions are preferably carried out adjacent to the contacting zone in a conventional sulfur burning means well-known in the art. The employment of submerged combustion techniques, whereby sulfur, e.g., is oxidized by means of oxygen below the surface of liquid to be concentrated in the contact zone are within the scope of this invention. Combustion temperatures range between about 1200 and about 2800° F. and the combustion products are preferably brought into contact with the phosphoric acid to be concentrated within this temperature range. Air is a preferable oxidizing agent although any oxygen-containing gas such as, e.g., oxygen enriched air and oxygen, can be employed. When air is employed, the sulfur burner effluent contains nitrogen, excess oxygen, and sulfur dioxide. The concentration of sulfur dioxide in the combustion products is preferably maintained between about 5 and about 20 mol percent.

Phosphoric acid in dilute aqueous solution is contacted with gaseous combustion products containing sulfur dioxide at an elevated temperature in a suitable contact zone to strip and evaporate water into a vaporous phase maintained over the liquid thereby concentrating the phosphoric acid. The operating temperature and pressure are adjusted to achieve the desired level of concentration in the contact zone. Operation of the contact zone under a total pressure which is essentially atmospheric is preferred and in this case the temperature of the gaseous material over the liquid in the contact zone is maintained broadly between about 100 and about 300° F., preferably about 150 and about 225° F. The phosphoric acid is preferably contacted with combustion products by introducing the gaseous material as a confined stream below the liquid level of a bath of acid which is to be concentrated. This method is preferred to obviate salt precipitation problems. Most preferably, the contact is effected in a plurality of stages wherein progressively more concentrated acid is contacted with gaseous combustion products at an elevated temperature. The use of gas sparging means situated in the lower portion of a bath of acid, and of packed towers wherein attenuated flow of the acid and gaseous material is achieved is likewise within the scope of the invention.

Wet sulfur dioxide gas withdrawn from the concentration or contact zone is converted to dilute sulfuric acid in a catalytic oxidation zone wherein salts of the following metals, for example, in aqueous solution are employed as the oxidation catalyst: manganese, iron, nickel, cobalt, and copper. The catalytic oxidation of sulfur dioxide to obtain relatively dilute sulfuric acid in this manner is well-known in the art. The sulfuric acid which is obtained generally has a concentration between about 15 and about 60 weight percent. In order to obtain sulfuric acid concentration above about 40 percent, however, it is necessary to introduce ozone or hydrogen peroxide for example, during the oxidation. The contact of sulfur dioxide and catalyst solution is effected in one or more stages as is needed to reduce the sulfur dioxide concentration in the gas to a level such that the remaining gaseous material can be purged as stack gas. In order to further reduce the sulfur dioxide concentration of the remaining gaseous material, such material can be absorbed in a suitable solvent, e.g., water. The reaction which occurs in the catalytic oxidation zone is represented as follows:

$$2SO_2 + O_2 + 2H_2O \rightarrow 2H_2SO_4 + 156K \text{ cal./mol}$$

The oxygen required in the catalytic oxidation zone can be supplied from any suitable source which is preferably either from excess oxygen in the combustion gases, from a secondary source of oxygen introduced directly into the oxidation zone, or by a combination of both methods.

Phosphate rock ore is contacted with an aqueous solution containing sulfuric acid produced in the catalytic oxidation zone in a suitable digestion zone to produce aqueous phosphoric acid. The ore contains tricalcium phosphate and preferably comprises between about 25 and about 40 percent $P_2O_5$ by weight. The ore is preferably comminuted before it is introduced into the digestion zone such that 85–95 percent pass 100 mesh Tyler screen. It is within the scope of the invention to recycle filtered phosphoric acid to the digestion zone such that the ore is contacted with a mixture of sulfuric and phosphoric acid. Another modification comprises contacting ore with filtered phosphoric acid and then completing the digestion process employing sulfuric acid derived from the catalytic oxidation zone. It is also contemplated to conduct the catalytic oxidation of sulfur dioxide and the digestion of the ore in a single zone of reacting materials. Dilute phosphoric acid having a concentration between about 10–40 weight percent in aqueous solution is obtained from the digestion zone. By reason of the dilute acid digestion treatment described above, the calcium sulfate crystals produced in the resulting dilute aqueous phosphoric acid generally exist in a hydrated form, e.g. ($CaSO_4 \cdot 2H_2O$), which is a relatively large crystal readily separated from an aqueous medium, for example, by filtration or decantation. The dilute aqueous phosphoric acid is then passed to a suitable contact zone for concentration employing the heat of reaction evolved in the production of sulfur dioxide.

For a better understanding of the present invention, reference is now made to the drawing which illustrates in diagrammatic form one embodiment of the process of the present invention and which is described with reference to an example of operation thereof.

In the drawing, sulfur burner 10 is provided in order to combust elemental sulfur introduced in line 14 in air which is introduced in line 12. In this example, 20.5 lb. mols per hour of sulfur are introduced via line 14 and 120 lb. mols per hour of air are introduced via line 12 for reaction in burner 10. Combustion occurs at a temperature of about 2700° F. and a gaseous mixture of combustion products containing sulfur dioxide is withdrawn from the burner in line 16. Line 16 is insulated with suitable material in order to minimize heat loss at this point. The composition of the gaseous material in line 16 is substantially as follows:

| Component: | Mol percent |
|---|---|
| Sulfur dioxide | 17 |
| Oxygen | 4 |
| Nitrogen | 79 |
| Total | 100 |

The combustion products in line 16 are introduced into contact zone 20 wherein the gaseous material is brought into contact with relatively dilute phosphoric acid in order to effect concentration thereof. In this example, the combustion products are passed as a confined stream in lance 18 to a point below the surface of a bath of aqueous phosphoric acid 19. An aqueous solution of phosphoric acid having a concentration of about 30 weight percent $H_3PO_4$ is introduced to bath 19 via conduit 24 at the rate of about 13.5 lb. mols $H_3PO_4$ per hour. Phosphoric acid having a concentration of about 59 percent by weight $H_3PO_4$ in aqueous solution is withdrawn from contact zone 20 in conduit 22. Gaseous material containing wet sulfur dioxide is withdrawn overhead in line 28 for passage to catalytic oxidation zone 30. The gaseous material in line 28 contains about 50 percent water. The temperature of the gaseous material is about 200° F. under essentially atmospheric pressure conditions.

Catalytic oxidation zone 30 comprises a stirred kettle or other suitable mixing vessel for the reaction to convert wet sulfur dioxide into dilute sulfuric acid. A suitable oxidation catalyst is employed which, in this example, is manganese sulfate. Catalyst is added at a rate such that there is present about 0.1 percent of the salt based on the total weight of acid. Zone 30 is maintained at about 40° C. by passing cooling water through cooling coil 31. Secondary air is introduced in line 33 at the rate of about 60 lb. mols per hour. The secondary air contains about 0.2 percent ozone which is produced by ionizing a portion of the secondary air in a suitable spark generator. Water is added at the rate of about 1292 pounds per hour in line 32. While zone 30 is shown schematically as a single vessel, staged countercurrent contact of air and progressively more concentrated acid is preferred in practice.

Sulfuric acid having a concentration of about 39 percent in aqueous solution is withdrawn from oxidation zone 30 in line 34 for passage to digestion zone 40 at the rate of about 20.3 lb. mols per hour. Florida Pebble Rock having the analysis set out in Table 1, below, is introduced into the digestion zone via conduit 42.

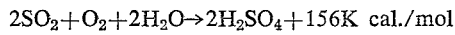

Table 1.—Analysis of phosphate rock

| Component: | Weight percent |
|---|---|
| CaO | 45.8 |
| $P_2O_5$ | 31.4 |
| $SiO_2$ | 7.4 |
| F | 3.7 |
| $Al_2O_3$ | 0.8 |
| $Fe_2O_3$ | 1.1 |

The digestion zone 40 comprises one or more open tanks or kettles for the reaction of the mineral acid and the phosphate to obtain phosphoric acid and calcium sulfate. The reaction proceeds without control over temperature and pressure under atmospheric conditions.

A dilute aqueous solution comprising about 30 weight percent $H_3PO_4$, hydrated crystals of calcium sulfate and insolubles, e.g., siliceous material, is withdrawn from the digestion zone in line 44 at the rate of about 13.5 lb. mols $H_3PO_4$ per hour. The insolubles and calcium sulfate crystals are separated from the aqueous medium by means of continuously fed centrifugal separators in the separation zone 50. Separated solid material is withdrawn to waste in line 52 and the dilute phosphoric acid is passed in line 24 to contact zone 20 for concentration as hereinbefore described.

Having thus described the invention with reference to a specific example of the operation thereof, many modifications and alterations will become apparent to those skilled in the art without departing from the present invention which is limited only by the claims.

We claim:

1. A process for the production and concentration of phosphoric acid: contacting an aqueous solution containing phosphoric acid and gaseous products of combustion obtained at an elevated temperature by oxidation of a sulfur-containing material in an oxygen-containing gas to produce sulfur dioxide thereby transferring water from thus-concentrated phosphoric acid into a wet gaseous mixture containing sulfur dioxide, catalytically oxidizing said wet gaseous mixture to obtain aqueous sulfuric acid, employing said aqueous sulfuric acid for the digestion of phosphatic material to obtain phosphoric acid and hydrated calcium sulfate, separating such calcium sulfate from said acid and then contacting said acid and gaseous combustion products as defined above to obtain concentrated phosphoric acid.

2. The process of claim 1 in which said sulfur-containing material comprises elemental sulfur.

3. The process of claim 1 in which said sulfur-containing material comprises hydrogen sulfide.

4. The process of claim 1 in which said oxygen-containing gas comprises air.

5. A process for the production and concentration of phosphoric acid: combusting a sulfur-containing material in an oxygen-containing gas to obtain a gaseous mixture containing sulfur dioxide at an elevated temperature, contacting an aqueous solution of phosphoric acid and said gaseous mixture in a suitable contact zone under conditions to remove water from thus-concentrated phosphoric acid, withdrawing said concentrated phosphoric acid as the product of the process and passing the gaseous mixture from the contact zone into contact with an aqueous solution of catalyst for the oxidation of sufur dioxide to obtain an aqueous solution of sulfuric acid, reacting such sulfuric acid and phosphate rock ore under conditions to produce phosphoric acid and hydrated calcium sulfate, separating said sulfate from said acid and concentrating said acid by contact with said gaseous mixture as defined above.

6. The method of concentrating phosphoric acid which comprises combusting a sulfur-containing material in an oxygen-containing gas to obtain a gaseous mixture containing sulfur dioxide at an elevated temperature, contacting an aqueous solution of phosphoric acid and said gaseous mixture at an elevated temperature in a suitable contact zone to transfer water from the concentrated phosphoric acid into said gaseous mixture.

7. The method of concentrating phosphoric acid which comprises combusting a sulfur-containing material in an oxygen-containing gas to obtain a gaseous mixture containing sulfur dioxide at an elevated temperature, providing a bath of aqueous phosphoric acid in a suitable contact zone and passing said gaseous mixture at an elevated temperature as a confined stream discharging below the surface of the bath to transfer water from said bath into said gaseous mixture, and withdrawing thus-concentrated phosphoric acid as a product of the process.

8. A process for producing and recovering concentrated phosphoric acid which comprises: passing gaseous products of combustion obtained at an elevated temperature between about 1200 and about 2800° F. by oxidation of a sulfur-containing material in an oxygen-containing gas to produce sulfur dioxide in contact with an aqueous solution containing phosphoric acid under conditions in the contact zone to transfer water from said solution into the gaseous mixture passing said gaseous mixture into an oxidation zone containing an aqueous solution of suitable catalyst salt to catalytically convert the sulfur dioxide contained in said gaseous mixture into an aqueous solution of sulfuric acid, contacting such acid and comminuted phosphate rock ore to produce aqueous phosphoric acid and hydrated crystals of calcium sulfate, separating such calcium sulfate from the aqueous phosphoric acid and passing the phosphoric acid in contact with the gaseous products of combustion to concentrate such acid as defined above.

9. The process of claim 8 in which the gaseous mixture over the aqueous solution in the contact zone is maintained at a temperature between about 100 and about 300° F.

10. The process of claim 8 in which the gaseous mixture over the aqueous solution in the contact zone is maintained under essentially atmospheric conditions and a temperature between about 150 and about 225° F.

11. A process for the production and concentration of phosphoric acid: combusting sulfur in air to obtain a gaseous mixture containing between about 5 and about 20 mol percent sulfur dioxide at a temperature between about 1200 and about 2800° F., contacting said gaseous mixture and an aqueous solution of phosphoric acid obtained as hereinafter defined to transfer water from thus-concentrated acid into the gaseous mixture, passing the wet gaseous mixture from the contact zone through an aqueous solution of catalyst salt in an oxidation zone under conditions to oxidize sulfur dioxide in the gaseous mixture and obtain an aqueous solution containing between about 15 and about 60 weight percent sulfuric acid, reacting such sulfuric acid and phosphate material in the digestion of phosphate rock ore to obtain an aqueous solution containing between about 10 and about 40 weight percent phosphoric acid, hydrated calcium sulfate, and insolubles, separating the aqueous phosphoric acid from solid material and concentrating such as defined above.

References Cited

UNITED STATES PATENTS

| 3,044,851 | 7/1962 | Young | 23—165 |
| 3,174,820 | 3/1965 | See et al. | 23—173 X |
| 3,294,487 | 12/1966 | Pauling | 23—168 |

OTHER REFERENCES

Copson et al: Indust. & Engr. Chem., vol. 25, No. 8, pp. 909–916 (1933).

OSCAR R. VERTZ, *Primary Examiner.*

MILTON WEISSMAN, *Examiner.*

A. GREIF, *Assistant Examiner.*